Inventor:
Richard J. Lech
By [signature]
Atty.

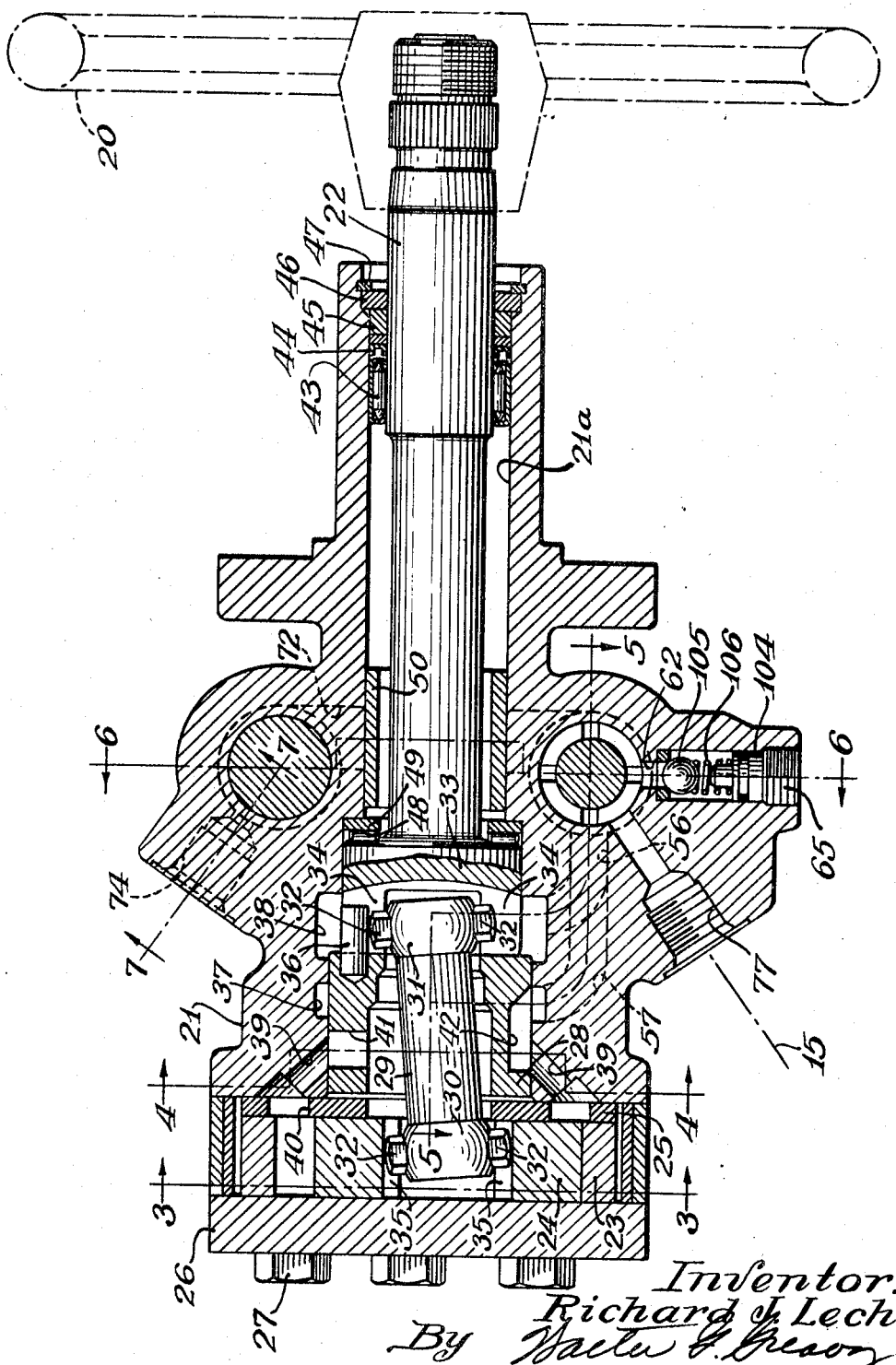

Inventor:
Richard J. Lech

May 27, 1969 R. J. LECH 3,446,021
POWER STEERING UNIT WITH POPPET DIRECTIONAL CONTROL VALVES
Filed June 14, 1967 Sheet 4 of 6

Inventor:
Richard J. Lech
By  Walter G. Geary
Atty.

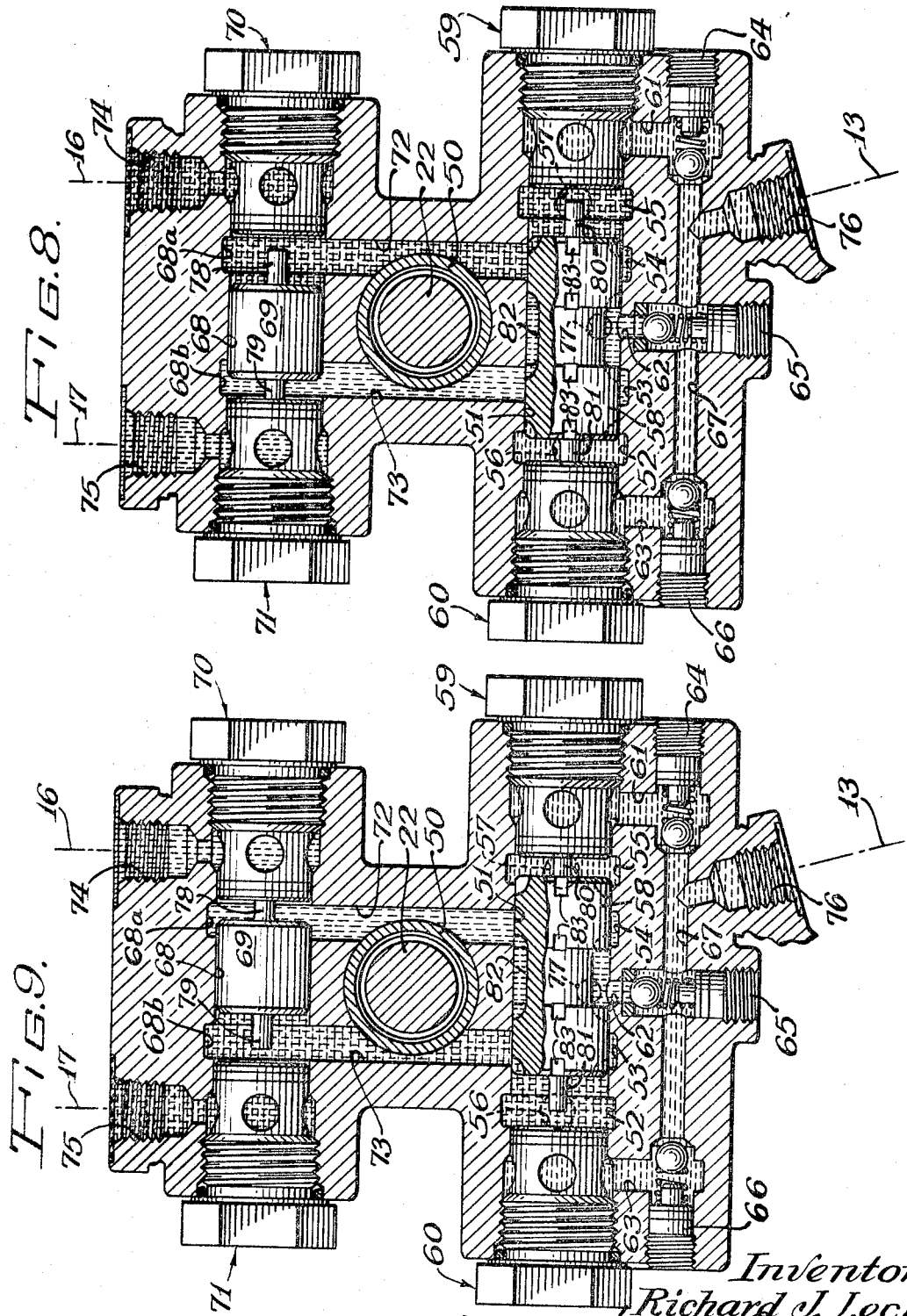

Inventor:
Richard J. Lech

United States Patent Office 3,446,021
Patented May 27, 1969

3,446,021
POWER STEERING UNIT WITH POPPET DIRECTIONAL CONTROL VALVES
Richard J. Lech, Hickory Hills, Ill., assignor to International Harvester Company, Chicago, Ill., a corporation of Delaware
Filed June 14, 1967, Ser. No. 646,034
Int. Cl. F15b 15/18
U.S. Cl. 60—52     11 Claims

ABSTRACT OF THE DISCLOSURE

A vehicular hydrostatic power steering unit wherein an operator controlled auxiliary fluid pressure source hand pump is associated in close physical relationship with a plurality of check valves, pilot poppet valves and shuttle elements actuable to control the fluid flow and the direction of said flow into and out of a hydraulic cylinder operative for turning the steerable wheels of a vehicle in constant pressure-closed center and conventional open center type hydraulic circuits or systems.

BACKGROUND OF THE INVENTION

This invention relates generally to hydraulic power steering systems, particularly of the hydrostatic steering type, and the valve control means employed therewith for controlling fluid flow and the direction of such flow through said system.

In prior hydrostatic power steering systems of the type generally shown in the Cassaday et al. U.S. Patents 2,974,491 and 2,995,012 it was known to employ a control or hand pump assembly communicatively interconnected with a remotely disposed differential pressure actuated variety linear spool-type shuttle valve operative for control of the direction of fluid flow transmitted under pressure to a fluid motor or power cylinder in the system. In one well known commercially marketed system of this character the hand pump is a gear within a gear type resembling the unit disclosed in the Dettlof et al. U.S. Patent 3,087,436. While this type hydrostatic power steering system found generally satisfactory favor when employed in association with an open-center hydraulic circuit it was not altogether suitable for use in a closed-center type of circuit because of the tendency of the shuttle valve assembly thereof to accumulate deposits of silt resulting in difficulties in the overall operation of the control of fluid flow therethrough. A further disadvantageous feature of such prior arrangement resides in the separation or remote disposition of the direction control shuttle valve from the hand pump assembly resulting in a cumbersome layout occupying excess space in an area in a vehicle where space is usually at a premium. Furthermore, in prior hydrostatic power steering systems, there was a tendency to "drift," an action which permits turning of the steerable wheels of the vehicle without moving the operator's control wheel, hence the operator did not always retain complete control of the steering operation. Prior attempts to provide an improved arrangement for overcoming some of these faults are disclosed in the copending U.S. patent applications Ser. Nos. 547,969, now Patent No. 3,360,932, and 627,353 assigned to the same assignee as the present invention. Other prior devices of general interest in somewhat similar hydraulic power steering systems include, the Charlson U.S. Patents Re. 25,126 and 2,939,429.

SUMMARY OF THE INVENTION

The present invention is more specifically directed to a hydrostatic power steering system in which a manually operable auxiliary fluid pressure source and a combination of shuttle members, unidirectional flow valves and poppet valves cooperatively disposed in a compact assembly provide means for controlling the flow of fluid and the direction of such flow into and out of the hydraulic steering cylinder of the said system. Since the proposed invention meets the requirements of a closed center system, such as providing a no leak, drift free system with accurate and dependable steering under all conditions, the proposed steering unit assembly is particularly adaptable for use with, but not limited to, the closed center type system, and is thoroughly compatible for application in closed center, constant pressure hydraulic systems. The proposed invention is also readily applicable for use with an open center system converted to a closed center system merely by incorporation of a priority valve assembly in the system.

The advantages of the proposed fluid control unit are further enhanced by the use of poppet valves therein that are so constructed and arranged as to permit the use of high system pressures for normally retaining them closed, while at the same time the relief or opening thereof is responsive to a relatively low fluid pressure, a most desirable objective. Furthermore, because of the selected relationship of a large radially extending area of a seat face of each individual valve to the exposed system pressure the movable member of each such valve need only be moved a very small distance axially to permit the passage of large quantities of fluid flow through the system. Additionally it has been found that in a system utilizing the proposed poppet valves good regulation is obtained with readily adjustable flows and the problem of silting is minimized.

The proposed arrangement is also economically advantageous since it eliminates the need for a spool type shuttle control valve remotely located from the conventional auxiliary pressure source hand pump as in present systems, thus providing a construction that makes for a more complete, compact and less costly unit occupying a minimum of space.

The principal object therefor is to provide an improved compact hydrostatic power steering fluid control unit that includes a manually operable hydraulic pump and a combination of shuttle members, poppet valves and unidirectional flow valves which cooperate to provide a no leak, drift free unit operable for providing accurate and dependable steering under all conditions.

Another object is to provide a power steering unit housing assembly having therein a manually operable pump providing an auxiliary fluid pressure source operative responsive to rotation of an operator's control wheel coupled therewith, and valving mechanism including a plurality of poppet valves and shuttle members cooperatively arranged for the control of fluid flow therethrough, and wherein said valving mechanism is selectively operative responsive to a differential of fluid pressures generated upon operation of said pump for controlling the flow of fluid and the direction of said flow into and out of a hydraulic cylinder of an associated vehicle hydrostatic power steering system.

A further object is to provide in a vehicle hydrostatic power steering control unit a direction of fluid flow control valving mechanism having a pair of linear shuttle members and two pairs of poppet valves, with a shuttle member disposed between a respective pair of said poppet valves and cooperative with each poppet of the pair thereof for controlling the flow of fluid through the unit, and wherein the operation of said poppets is responsive to differentials of fluid pressures generated by one or more sources of fluid pressure.

Another important object is to provide a hydrostatic power steering fluid control unit that includes a manually operable gear within a gear hydraulic pump and a plurality of shuttle members and poppet valves cooperatively disposed relative to one another and to said pump and operative to provide a no leak, drift free steering unit that provides accurate and dependable steering under all conditions, and wherein said poppet valves include small pilot poppet means so constructed and arranged within said poppet valves as to permit the use of high system fluid pressures for normally retaining said valves closed and relatively low fluid pressures for effecting the relief or opening thereof.

A further important object is to provide in a hydrostatic power steering unit of the character including a manually operable hand pump and a valving mechanism cooperative therewith to provide in a vehicle hydraulic steering system accurate and dependable steering under all conditions, and wherein said valving mechanism includes a plurality of poppet valves each of which is disposed with a large radially extending area of a poppet element therein exposed to the system pressure so that upon small axial movement of said poppet element the passage of large quantities of fluid through the system is permitted.

The foregoing and other objects and features of the invention will become apparent as the disclosure is more fully made in the following detailed description of a preferred embodiment of the invention as illustrated in the accompanying sheets of drawings.

DESCRIPTION OF THE DRAWINGS

FIGURE 2 is a longitudinal vertical sectional view taken generally along the line 2—2 of FIGURE 10 and showing a hydrostatic power steering hand pump assembly incorporating the proposed invention;

FIGURES 8 and 9 are developed partial sectional views, somewhat similar to FIGURE 6, depicting the fluid pressure conditions in the circuits through the steering assembly during right and left turns, respectively;

DESCRIPTION OF THE PREFERRED EMBODIMENT

Figure 1:
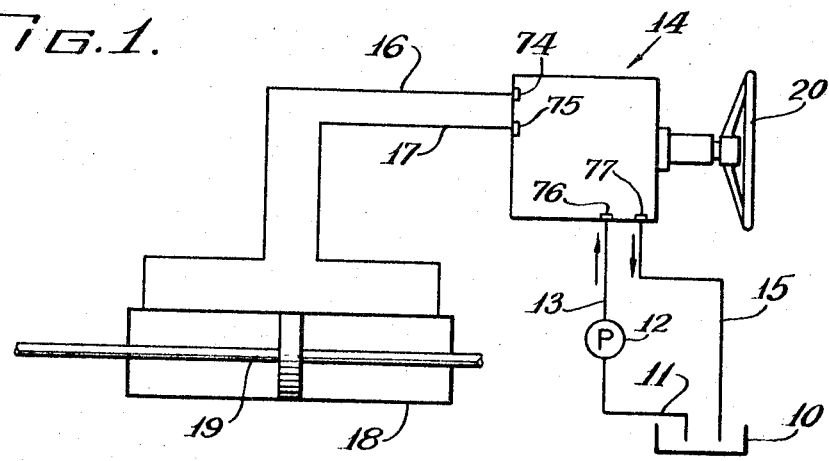
FIGURE 1 is a schematic representation of a hydrostatic power steering system in association with a closed center, constant pressure hydraulic circuit and wherein the proposed invention has been incorporated.

Referring now to the drawings it will be seen that FIGURE 1 depicts generally schematically the components of a hydrostatic power steering system comprising a reservoir source of fluid 10 connected by a conduit 11 with the inlet of a hydraulic supply pump 12 the outlet or discharge side of which connects by a conduit 13 with a power steering unit or fluid control assembly, indicated in its entirety by the reference numeral 14. An outlet or return from said fluid control assembly is connected by a conduit 15 with reservoir 10, while conduits 16, 17 interconnect said assembly with opposite ends of a conventional fluid power motor or power steering cylinder 18. It will be understood the piston rod 19 of said cylinder may be connected by any conventional or well-known operating means with the vehicle wheels to be steered, while the assembly 14 will be provided with suitable operating control means such as the operator's hand-operated steering wheel indicated at 20.

The power steering assembly 14 selected for purposes of illustrating a preferred application of the present invention incorporates therein a gear within a gear type auxiliary fluid pressure generating hand pump generally similar, except for the modification proposed herein, to the unit manufactured by the Ross Gear and Tool Company, Inc., of Lafayette, Ind., and marketed under the trade designation of Hydrostatic Hand Pump HDS-P2, 11–62, and generally described in the Dettlof et al. U.S. Patent 3,087,436.

In said steering assembly a housing 21 has a bore 21a therein that receives a drive shaft 22 which projects outwardly beyond one end of the housing and has secured to said outwardly projecting end an operator's control wheel 20. The opposite end of said housing mounts pump elements which include an interiorly toothed outer annular element 23 and an exteriorly toothed inner element 24, and a wear plate 25, disposed between element 23 and an adjacent wall or face of housing 21, that is clamped along with said outer element between the housing and a cover plate 26 by suitable fastening means such as the bolts or cap screws 27.

A valve sleeve 28 in the bore of said housing accommodates a shaft 29 therethrough, for transmitting drive from drive shaft 22 to inner pump element 24, and opposite ends of shaft 29 are formed as frusto-spherical heads 30, 31 with a pair of diametrically opposite studs 32, 32 projecting radially therefrom. An enlarged head-like extension 33, of drive shaft 22, is fashioned with an axial recess that receives the frusto-spherical head 31 of shaft 29, and with a pair of diametrically extending slots 34, 34 that slidably receive the studs 32, 32 of the head 31. Inner pump element 24 has a central bore for receiving the frusto-spherical head 30, and axially extending grooves 35, 35 for slidably receiving the studs 32, 32 of the latter head.

The meshing teeth of the inner and outer pump elements are formed, as is well known, so that as inner element 24 rotates on its axis it orbits within the outer element and said teeth cooperate effectively to divide the space between these elements into suction and pressure chambers, each of which alternately expands and contracts as the inner element 24 orbits. A drive pin 36 mounted in sleeve valve 28 and projecting therefrom extends into one end of one of the slots 34 in extension member 33 and serves for rotating sleeve valve 28 at the same speed as drive shaft 22.

Annular grooves 37, 38 opening into the bore of housing 20 communicate respectively, with opposite openings of the hand pump elements as will be subsequently explained. Since annular groove 38 is disposed in the plane of slot 34 it is in continuous communication through said slot with the interior of valve sleeve 28, while annular groove 37 is located within the axial limits of sleeve 28. A circumferentially spaced series of ports 39 in housing 21 open into the bore thereof and communicate respectively, through openings 40 in wear plate 25 with spaces between the teeth of outer pump element 23. A series of radial passages 41 in valve sleeve 28, corresponding in number to the teeth of inner pump element 24, cooperate with ports 39 and intermediate adjacent ones of the radial passages 41 the exterior surface of the valve sleeve 28 is provided with axially extending grooves 42 which overlap annular groove 37 and also cooperate with ports 39 in housing 21 (FIGURES 2 and 4).

Figure 3:
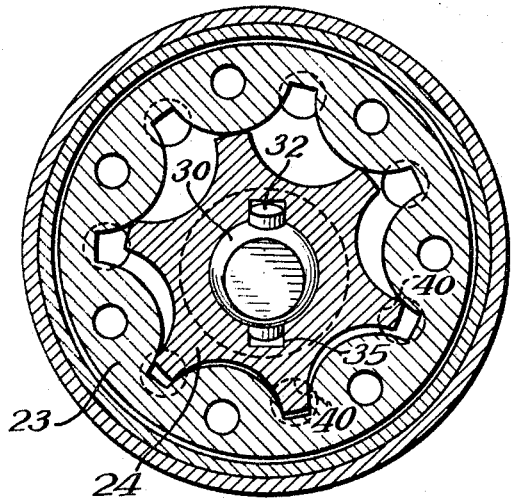
FIGURE 3 is a vertical sectional view taken along the line 3—3 of FIGURE 2.
Figure 4:
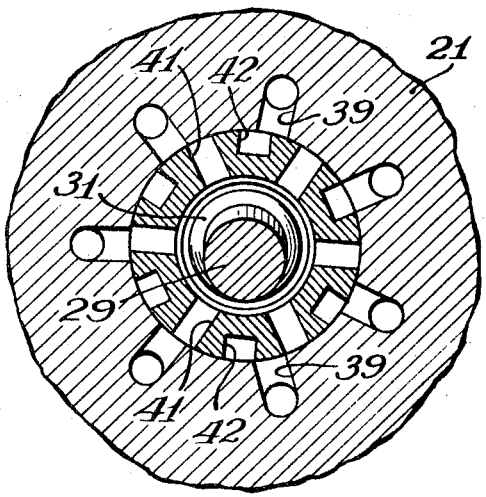
FIGURE 4 is a vertical sectional view taken along the line 4—4 of FIGURE 2.

The manner in which radial passages 41 and axially extending grooves 42 cooperate with ports 39 to establish fluid communication between the pump chambers and annular grooves 37 and 38 will be apparent from FIGS. 3 and 4 wherein the inner pump element 24 and valve sleeve 28 are shown in their simultaneously occupied positions. Passages 41, 42 are so oriented with respect to the teeth of inner pump element 24 that as each of such teeth reaches the point of deepest mesh with a space between the teeth of outer element 23 the valving port 39 will be occluded by one of the lands of valve sleeve 28.

It will be readily apparent from the above that valve passages 41 and grooves 42 will cooperate communicatively with the ports 39 to connect each expanding pump chamber with one of the annular grooves 37, 38 and each contracting pump chamber to the other of such annular grooves. As shown, counterclockwise rotation of drive shaft 22 will produce clockwise orbiting of the inner pump element, connecting of contracting pump chambers to annular groove 38 through radial passages 41, and connection of expanding chambers to annular groove 37 through radial passages 41, and connection of expanding chambers to annular groove 37 through valve grooves 42.

Shaft 22 may be journaled by an anti-friction bearing such as 43 disposed in bore 21a, of housing 21, while an adjoining fluid seal ring 44 backed up with a washer 45 and spacer 46 are maintained in position by a snap ring 47 mounted in an annular groove in said housing bore proximate the end thereof. Adjoining the junction of drive shaft 22 and the enlarged extension head 33 thereof there is provided a journalling bearing 48 and a back-up washer 49 to stabilize and journal the inner end portion of said drive shaft member. A sleeve member 50 tightly positioned in bore 21a and radially spaced from drive shaft 22 is provided for a purpose that will subsequently be discussed.

Figure 5:
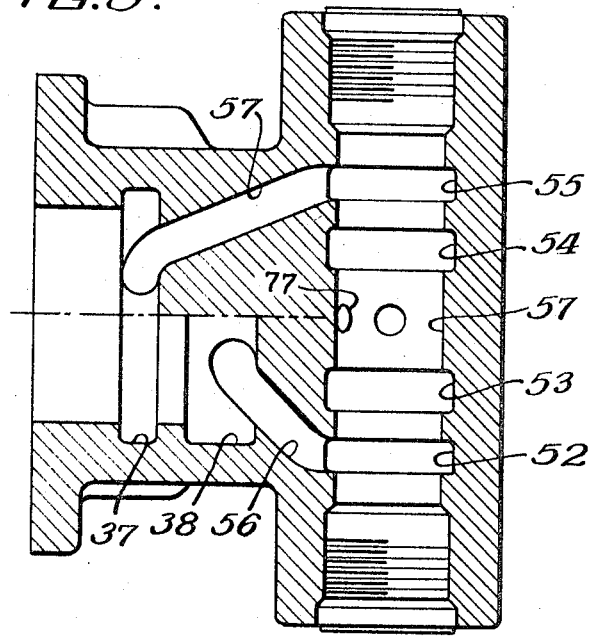
FIGURE 5 is a horizontal sectional view taken generally along the line 5—5 of FIGURE 2 but showing only the housing.

Now in accordance with the more specific teachings of the present invention there is provided a bore 51 (FIGS. 2 and 5) extending transversely of housing 21 and having a plurality of axially spaced annular grooves 52, 53, 54 and 55 (FIG. 5) formed therein. A fluid passage 56 interconnects annular groove 52 with annular groove 38, while a fluid passage 57 interconnects annular groove 55 with annular groove 37. Positioned within bore 51 is a shuttle element or member 58 which is disposed intermediate a pair of pilot poppet valves 59, 60 that extend inwardly one each from an opposite end of said bore. A plurality of axially spaced passages 61, 62, 63 opening into bore 51 communicate with respective unidirectional flow or check valves 64, 65 and 66, threadably mounted in housing 21 and a transversely extending passage 67 communicatively interconnecting all three said check or unidirectional flow valves.

Spaced from bore 51 and disposed generally parallel thereto is another transversely extending bore 68 having a pair of axially spaced annular grooves 68a, 68b therein, and slidably accommodated in said bore intermediate a pair of pilot poppet valves 70, 71 extending into the bore one each from an opposite end thereof is a shuttle element or member 69. A pair of passages 72, 73 interconnect the interiors of bores 51 and 68 at points axially spaced along said bores. The sleeve 50 in bore 21a serves to seal off the latter passages from one another and thus prevents fluid communication therebetween.

A pair of cylinder port openings 74, 75 in housing 21 open into bore 68 at points adjoining respective ones of the poppet valve 70, 71 and are connected by way of conduits 16, 17 with opposite ends of cylinder 18. An inlet port opening 76 in said housing opens into the transverse passage 67 and connects by way of conduit 13 with the main pump 12, while an outlet or return fluid port opening 77 in the housing opens into the interior of bore 51 (FIGS. 1 and 2) and connects by way of conduit 15 with the reservoir or sump 10.

The shuttle member or element 69 is fashioned with a pair of oppositely projecting and axially extending pins or studs 78, 79, while shuttle member or element 58 has a similar pair of pins or studs 80, 81, for engaging the proximate poppets as will subsequently be further explained. Shuttle 58 is additionally fashioned intermediate the ends thereof with an annular groove 82 and with a plurality of circumferentially and axially spaced notches 83 adjacent end edge portions of the shuttle which notches function to facilitate and hasten passage of fluid into adjoining chambers or passages.

Since the poppet valve assemblies 59, 60, 70 and 71 are identical units only one such thereof need be described in detail. Each such poppet valve unit comprises an outer body or casing 84 having a reduced diametered portion 85 that is threaded and adapted for threadable positioning in one end of a respective one of the bores in housing 21. An O-ring type of seal 86 may be provided, as indicated, at the junction of the reduced diametered portion and a head portion 84a of the valve body for fluid sealing purposes as is well understood. A centrally disposed and longitudinally extending bore 87 in the poppet valve body has positioned therein an end wall or closure member 88 that is retained against outward displacement by a snap-ring 89 disposed in an annular groove in said bore, and a fluid seal 90 disposed in an annular groove on the wall member provides suitable fluid sealing for said closure wall member. A central recess 91 in said end wall member provides a cup-like seat for a coil spring 92. A poppet valve element 93 slidably disposed in bore 87 and fitted with a fluid seal 94 has a central recess 95 therein dimensioned to accommodate one end of spring 92 as well as a small pilot poppet element 96 slidably positioned in said bore and disposed in abutting relation with the proximate end of said spring. The bore 87 has at one end thereof a reduced diameter portion 97 that provides an abutment or stop for limiting axial movement of the poppet element 93 in one direction while the end wall closure member 88 limits axial movement of said element in the other direction. A plurality of radially extending and circumferentially spaced openings 98 in body 84 communicate with the interior of bore 87, and, by way of a plurality of small diametered radial passages 99, with the interior of recess 95. The pilot poppet element 96 is fashioned with a pair of oppositely projecting and axially extending pins 100, 101, with pin 101 extending into one end of spring 92 while pin 100 is loosely positioned in an aperture 102 provided in an end wall portion of poppet element 93. The pilot poppet element 96 is generally square in cross section but with rounded corners that provide axial passages and thus permit the passage of fluid therealong into the area or chamber formed between the end wall 88 and the inner end of poppet element 93. An additional fluid seal 103 disposed in an annular groove proximate the inner end of body 84 of the poppet assembly provides additional fluid sealing means as is well understood.

In the normally closed position of the poppet fluid enters through openings 98 and thereafter passes by way of the small diametered radial passage 99 into the interior of recess 95 and flows past pilot poppet element 96 into the chamber 96a formed between valve element 93 and the stop or end wall element 88. The pressure of such fluid then operates to maintain the valve element 93 seated or closed against the seat provided by the reduced diametered portion 97 of the body 84. When the pilot poppet 96 is moved against the reaction of spring 92, as a result of engagement of the pin 100 thereof by an adjacent pin of one of the shuttle members or elements, fluid communication is established between the opening 98 and the outer wall surface of element 93 thus permitting the pressure of the fluid to be effective for slidably displacing the latter element away from its seat with the wall portion 97. When this occurs free fluid communication is established from the openings 98 through the valve to the associated fluid passage. Then, when the force exerted by an associated shuttle pin is removed from pin 100 thereof the pilot element 96 is moved by reaction of spring 92 back into its normally seated position and thereafter the valve poppet element 93 is likewise seated to close off the free flow of fluid through the valve.

Since the check or unidirectional flow valves 64, 65 and 66 are identical and may be of any well known manufacture a detailed description thereof is believed unnecessary. Suffice it to say each such valve may include a threaded body or base such as 104 (FIG. 2) adapted for threadably mounting the unit in a threaded opening in housing 21, and a ball valve member 105 normally maintained in seated position against an end edge of a proximate fluid passage by a spring such as shown at 106. Since the operation of such unidirectional flow or check valves is so well known further explanation thereof appears unnecessary herein.

OPERATION

Figure 6:
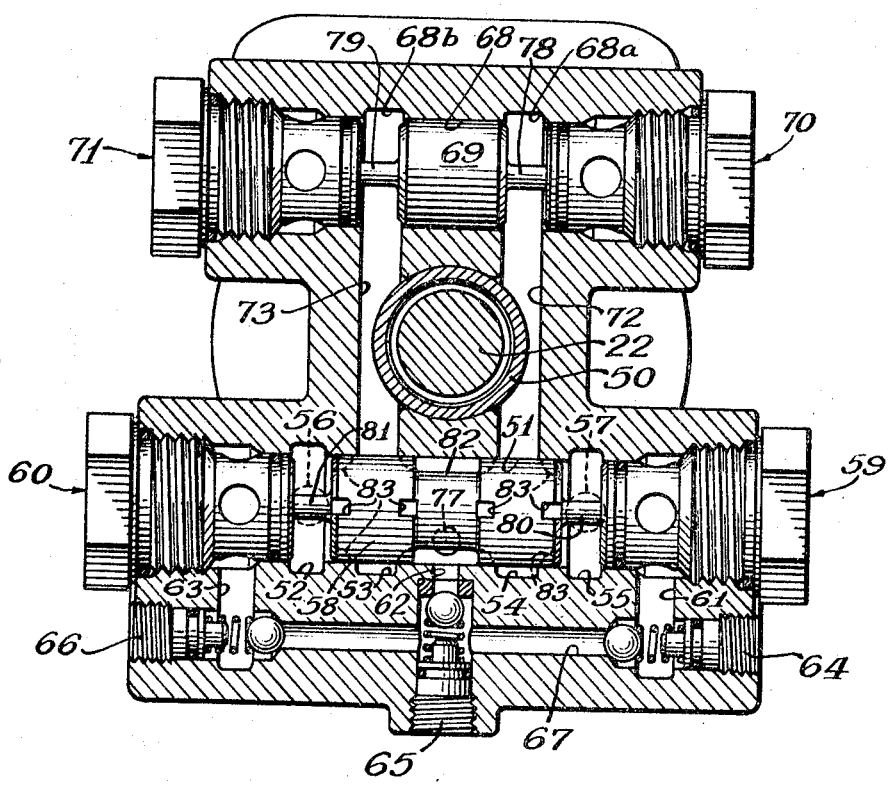
FIGURE 6 is a vertical sectional view but with portions thereof shown in elevation taken along the line 6—6 of FIGURE 2.
Figure 7:
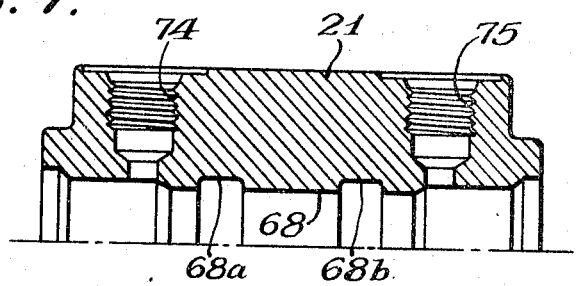
FIGURE 7 is a somewhat fragmentary transverse sectional view taken along the line 7—7 of FIGURE 2.
Figure 10:
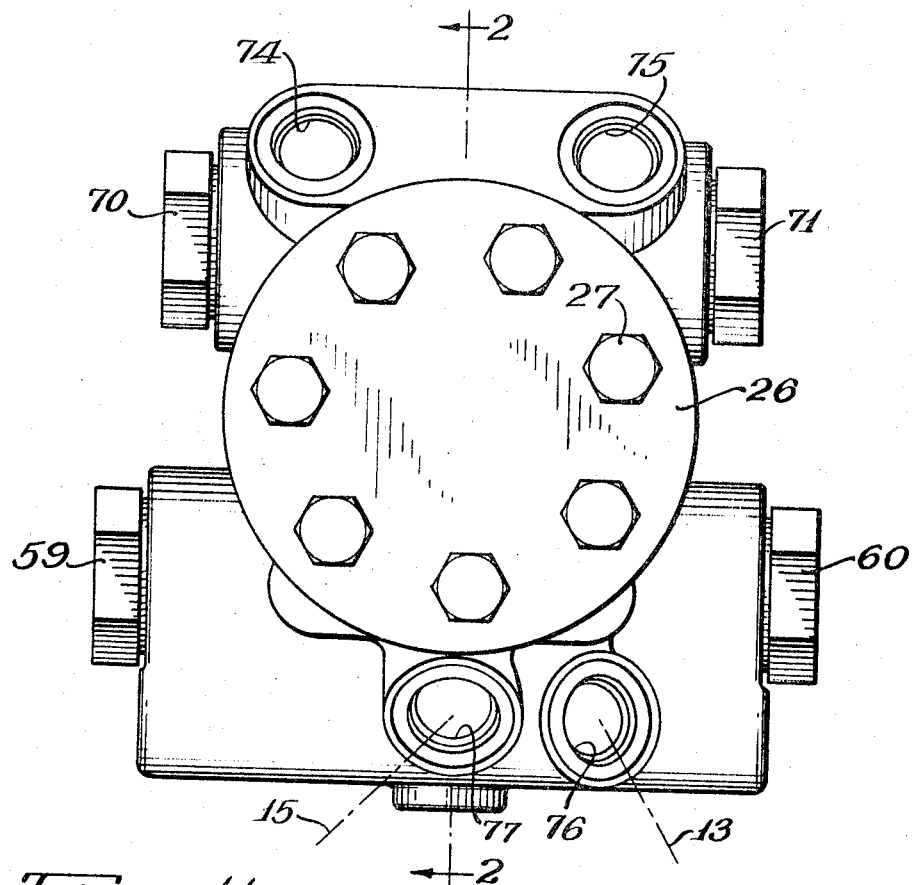
FIGURE 10 is an end elevational view of the fluid control assembly of FIGURE 2.
Figures 11, 11A:
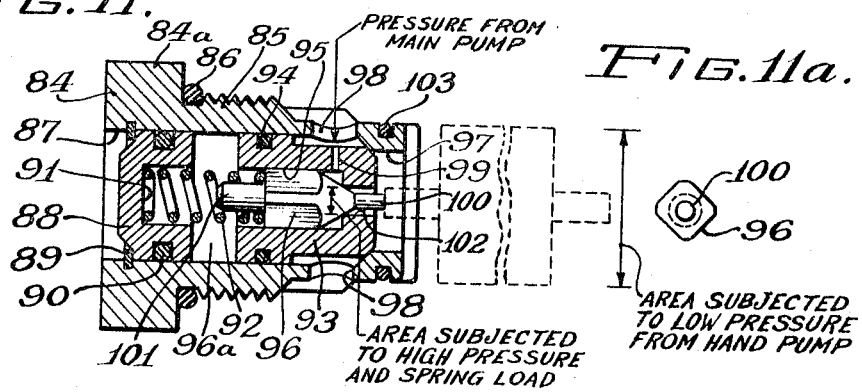
FIGURE 11 is a longitudinal sectional view, on an enlarged scale, of the pilot type poppet employed.
FIGURE 11a is an elevational view of the pilot poppet element of the poppet valves of the invention.

With the system in neutral, such as when driving straight ahead or when the vehicle is stopped with the steerable wheels centrally positioned, fluid flow from main pump 12 is transmitted by way of conduit 13 to the inlet port opening 76 and thereafter into transverse passage 67. Fluid under pressure in this passage is effective to open check valves 64 and 66, while aiding in maintaining check valve 65 closed, and thereafter filing the poppet valves 59 and 60 and maintaining said poppets closed. Under this condition the pressures in poppets 59 and 60 are equalized and shuttle 58 is centered therebetween, as seen in FIGURE 6, and fluid flow from opposite ends of cylinder 18 is blocked or cut-off because said shuttle when so centered blocks or cuts off the outlet or return port opening 77 while the pilot valve 70, 71 which are closed cut off flow from the cylinder into conduit 72 or 73. The main purpose of pilot valves 70, 71 being to prevent fluid from leaving the cylinder when no action takes place at the operator's wheel.

Now assume the operator's control wheel 20 is rotated to make a right turn for the vehicle. In such event the output or discharge from the hand pump unit is directed by way of annular groove 37, passage 57 and annular groove 55 into bore 51 where it is brought into engagement with poppet 59 and with the proximate end face of shuttle 58 (FIG. 8). Even though the fluid output discharged from the gear within a gear hand pump reacts against a much larger area of the poppet 59 than does the higher pressure flow from the main pump the poppet 59 remains closed and the hand pump pressure is effective for moving shuttle 58 leftwardly, as viewed in FIGURE 8. As shuttle 58 moves leftwardly passage 72 is opened to communication with bore 51 and pin 81 in the opposite end of said shuttle engages the cooperating pin 100 in poppet 60 to open the latter poppet to the flow of fluid therethrough so that fluid from the main pump 12 is permitted into passage 56 and the inlet or suction side of the gear within a gear hand pump. With passage 72 opened to communication with bore 51 fluid discharged from the hand pump by way of passage 57 is transmitted therethrough and by way of annular groove 68a into the interior of bore 68. The pressure of this fluid reacting against an end face of shuttle 69 and adjacent poppet 70 becomes effective for opening the latter poppet to permit the passage of fluid therethrough and into cylinder port opening 74 and by way of conduit 16 into one end of cylinder 18. Simultaneous therewith this fluid pressure reacting against the end face of shuttle 69 is also operative for effecting a leftward movement of said shuttle, as viewed in FIGURE 8, which movement opens communication, by way of conduit 17, cylinder port opening 75, bore 68 and annular groove 68b, between the opposite end of cylinder 18 and the passage 73 which, in turn, communicates by way of bore 51, annular groove 82, return port opening 77 and conduit 15 with the reservoir or sump 10. As is well understood movement of the piston in one direction in cylinder 18 effects a turning of the steerable wheels of an associated vehicle through suitable mechanism, not shown, while movement of the piston in the opposite direction causes a turning of the wheels in an opposite direction. Since the mechanism to accomplish such turning operation may be conventional and is well known the structural details thereof are omitted from the present disclosure. Upon returning the operator's control wheel to a neutral or centered position fluid flow through the hand pump is interrupted and the main pump pressure again becomes effective for centering shuttle 58 which when thus centered prevents the flow of fluid into and out of cylinder 18.

Referring now to FIGURE 9 it will be seen that when the operator's control wheel 20 is rotated to bring about a left turn fluid discharged from the hand pump is admitted by way of annular groove 38, passage 56 and annular groove 52 into bore 51 and thus into contact with poppet 60 and with an opposite end surface of shuttle 58. As a result shuttle 58 is moved rightwardly and fluid is passed by way of passage 73 and annular groove 68b into bore 68, while pin 80 in the opposite end of said shuttle engages and opens poppet 59 to the flow of fluid therethrough from the main pump into passage 57 and the inlet or suction side of the hand pump. The fluid in bore 68 is simultaneously operative for opening poppet 71 and shifting shuttle 69 rightwardly whereupon cylinder port opening 75 and one end of cylinder 18 is opened to the flow of fluid from said hand pump, while the opening of poppet 70 operates to communicate the opposite end of cylinder 18 with the passage 72 and, by way of annular groove 54, bore 51 and annular groove 82, with the return port opening 77 which in turn communicates with reservoir 10.

In the event steering becomes necessary when the engine is not operating, or if there is a malfunction in the main pump 12, turning of the operator's control wheel 20 will cause the discharge from the hand pump to be directed, as before, in case of a right turn, into passage 57, annular groove 55, passage 72 and cylinder port opening 74 into one end of cylinder 18. Concomitant therewith fluid discharged or drained from the opposite end of cylinder 18 is transmitted by way of passage 73 through check valves 65 and 66 and through poppet 60 into the inlet passage 56 of the hand pump. When a left turn is negotiated under this condition the return flow from cylinder 18 is passed through check valves 65, 64 and poppet 59 into passage 57 which communicates with the then suction or inlet side of the hand pump, while the opposite side of said hand pump discharges fluid by way of communicating passage 56 into the opposite end of cylinder 18. In the event of a shortage or deficiency, because of leakage or otherwise, in the quantity of fluid being recirculated between the cylinder 18 and the gear within a gear pump such deficiency is made up by suction of fluid out of reservoir 10 and through conduit 15 into the port opening 77 which in turn communicates with bore 51 and the proximate check valve 65.

In order to accommodate existing vehicles designed with open center hydraulic systems, the poppet valve type steering system, as proposed herein, can be used in association with a balanced poppet valve added upstream of the unit to perform as efficiently as in a closed center system.

Figure 12:
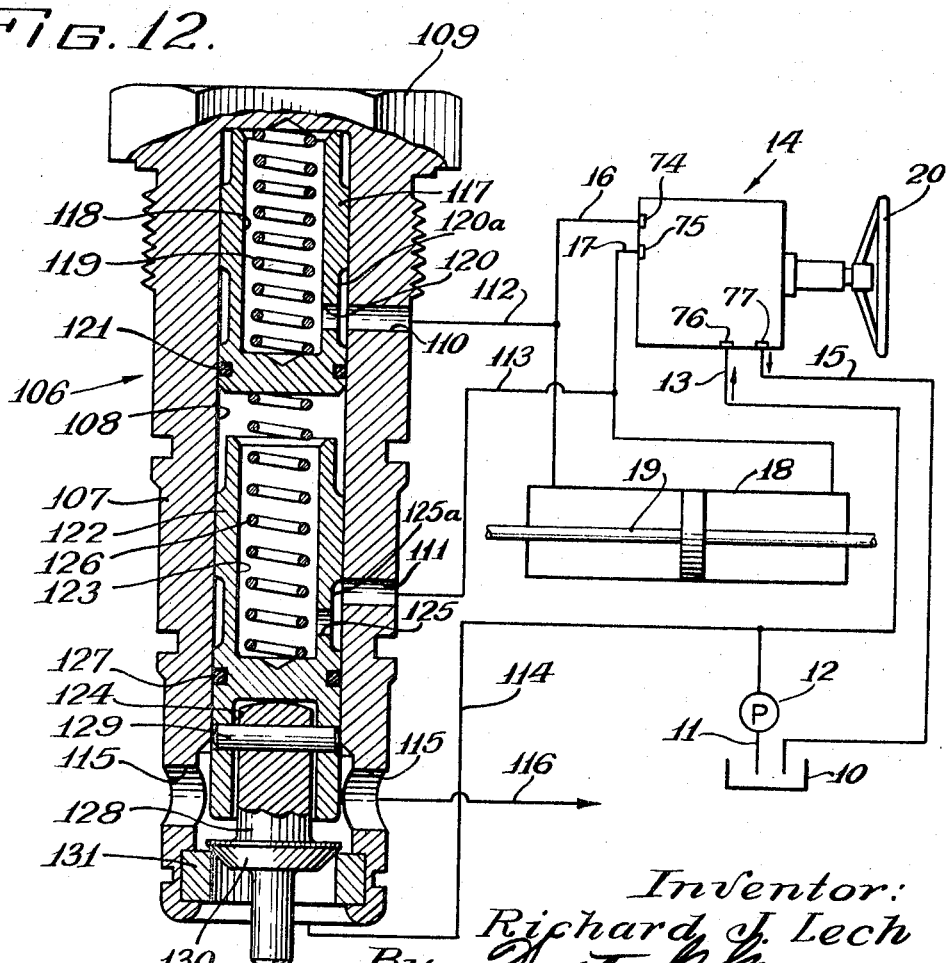
FIGURE 12 is a longitudinal sectional view of a proposed balanced poppet valve and a schematic representation of its application with the proposed invention in an open-center hydraulic circuit.

Referring now in FIGURE 12 where there is illustrated one form of a balanced poppet suitable for this purpose it will be seen such valve assembly, indicated generally by the reference numeral 106, includes a body or casing 107 having a central bore 108 therein one end of which may be closed by a cover or closure member 109. Radial openings 110 and 111 in said casing open into the interior of bore 108 and are connected by the respective conduits 112 and 113 to conduits 16 and 17 which, in turn, interconnect power steering unit 14 with the hydraulic motor or cylinder 18. The end of bore 108 opposite closure member 109 is connected by a conduit 114 to conduit 13 which interconnects the primary source of fluid pressure or main pump 12 with the inlet port opening 76 of the power steering unit 14 while the inlet or suction side of said pump connects by conduit 11 with reservoir 10, and the outlet or discharge port opening 77 of said steering unit connects by conduit with fluid reservoir 10. An opening 115 in said casing is adapted for connection by a conduit such as 116 to other equipment or another hydaulic circuit operated by fluid under pressure from pump 12.

A plunger element 117 having a recess 118 in one end thereof is slidably mounted in bore 108 and a spring 119 positioned in said recess is disposed for compressible abutment with the closed end wall of said element and with closure member 109. A radial opening 120 in element 117 communicates the interior of the recess thereof with an annular groove 120a and the proximate opening 110 and conduit 112. A fluid sealing ring 121 disposed in an annular groove in said element is provided for well known purposes.

A piston member 122 has a recess 123 extending inwardly from one end thereof and another recess 124 extending inwardly from the opposite end of the piston. A radial opening 125 communicates the interior of recess 123 with an annular groove 125a and the proximate opening 111 and conduit 113, and a spring 126 disposed in recess 123 compressibly abuts plunger element 117 and the inner end of the latter recess. A fluid seal 127 mounted in an annular groove in the exterior surface of piston 122 functions in well known manner to limit fluid leakage therealong. A poppet member 128 positioned in recess 124 may be fixedly positioned in piston 122 by a pin 129 transversely extending through said member and into opposite side walls of the latter recess in said piston. An enlarged head 130 on the outwardly extending end of poppet 128 is dimensioned to seat in overlapping relation against an edge portion of a valve seat member 131 positioned in an open end of bore 108. After all the individual components including the poppet 128 are positioned in bore 108 the end of casing 107 may be rolled over as illustrated to retain the seat member 131 permanently against displacement thus also retaining all the other components against removal from said bore.

The primary function of this balanced poppet is to act as a bypass in an open center system without modifying or altering the functions or operation of the hereinabove proposed power steering control unit. Normally the fluid pressure supplied by pump 12 is operative to displace poppet heat 130 off its seat allowing fluid flow to bypass the steering circuit passing instead through the valve from pump 12 to the equipment of hydraulic circuit connected to conduit 116. Upon initiation of steering action by movement of control wheel 20 a pilot signal in the form of a fluid pressure generated by the hand pump is transmitted, depending upon direction of rotation of the control wheel, either through conduit 112 and openings 110, 120 or conduit 113 and openings 111, 125 to the interior of the respective recesses in plunger 117 and piston 122 causing the poppet 128 to be seated and closing off fluid flow therethrough from pump 12. Upon closing of said poppet fluid flow becomes available for use by the steering circuit whereupon the power steering control unit functions as heretofore explained.

It should now be apparent that a novel poppet valve type hydrostatic power steering control unit adaptable for open and closed center hydraulic circuits has been shown and described, and it is to be understood that changes may be made in the construction without departing from the spirit of the invention or the scope thereof as defined in the appended claims.

What is claimed is:

1. In a vehicle hydrostatic power steering system having a fluid power motor for turning steerable wheels of a vehicle, a reservoir source of fluid, and a primary source of fluid pressure, the combination therewith of a fluid controller, comprising: means providing an auxiliary fluid power source operative responsive to rotation of an associated operator's control wheel for providing fluid pressure to the system normally as a supplement to said primary source of fluid pressure and operative upon interruption of flow from the latter source as the sole source of fluid pressure for the system, fluid control valve means operative responsive to a pressure differential generated upon operation of said auxiliary fluid pressure source between the pressure of fluid admitted from said primary source to said controller and the pressure of the fluid discarged from said auxiliary fluid pressure source for selectively controlling fluid flow from both said fluid pressure sources to opposite ends of said fluid power motor for operation of the latter while concomitant therewith releasing fluid to said reservoir source of fluid from an end of said motor opposite the end to which fluid is admitted during a selective operation of said control valve means, said fluid control valve means including a first pair of poppet valves axially spaced with a first shuttle member slidably mounted therebetween, a second pair of poppet valves axially spaced with a second shuttle member slidably mounted therebetween, and a plurality of unidirectional flow valves cooperative with said poppet valves for controlling fluid flow through said control valve means.

2. In a vehicle hydrostatic power steering system having a fluid power motor for turning steerable wheels of a vehicle and a reservoir source of fluid, the combination therewith of a fluid controller, comprising: a housing structure, a gear within a gear fluid pump mounted in said housing and operative responsive to rotation of an associated operator's control wheel for providing fluid pressure to the system, fluid control valve means including a plurality of unidirectional flow valves operative for selectively directing fluid released from opposite ends of said fluid power motor to said fluid pump for recirculation therethrough, said fluid control valve means being responsive to a pressure differential generated upon operation of said pump between an inlet and an outlet of said pump for selectively controlling fluid flow to opposite ends of said fluid power motor for operation of the latter while concomitant therewith releasing fluid from an end of said motor opposite the end in which fluid is admitted during a selective operation of said control valve means.

3. In a vehicle hydrostatic power steering system according to claim 2, and further comprising: a priority valve interposed between said source of fluid and said power motor.

4. In a vehicle hydrostatic power steering system according to claim 1, and further comprising: a working hydraulic circuit, said primary source of fluid pressure connected to said working circuit, and a poppet valve interposed between said primary source and said working circuit and operative responsive to the pressure developed in either end of said power motor to restrict flow between said primary source and said circuit in proportion to the magnitude of said developed pressure.

5. In a hydrostatic power steering system having a fluid power motor for tuning steerable wheels of a vehicle, a reservoir source of fluid, and a primary source of fluid pressure, the combination therewith of a fluid control assembly comprising: a housing structure; a gear within a gear fluid pump mounted in said housing and operative responsive to rotation of an associated operator's control member for providing fluid pressure to the system normally as a supplement to said primary source of fluid pressure and operative upon interruption of pressure from the latter source as the sole source of fluid pressure for the system; fluid control valve means including, first and second poppet valves mounted in axially spaced relation in opposite ends of a first bore formed in said housing and having a first shuttle member slidably disposed in the bore between said first and second poppet valves, third and fourth poppet valves mounted in axially spaced relation in opposite ends of a second bore formed in said housing and having a second shuttle member slidably disposed in the latter bore between said third and fourth poppet valves, and a plurality of unidirectional flow valves opening into said first bore; said fluid control valve means being operative responsive to a differential of pressures, generated upon operation of said gear within a gear pump, acting upon opposite ends of said first shuttle member and causing displacement of said second shuttle member and the opening of said third and fourth poppet valves to thereby control fluid flow to one end of said fluid power motor for operation of the latter while simultaneously therewith releasing fluid from an opposite end of said motor.

6. The invention according to claim 5 wherein the plurality of unidirectional flow valves are operative to permit fluid flow from said primary source of fluid pressure selectively to the inlet and outlet of said gear within a gear pump, and upon interruption of flow from said primary source of fluid pressure for selectively directing fluid released from said fluid power motor to said pump for recirculation therethrough.

7. A fluid flow control unit, comprising: a housing structure; a gear within a gear pump disposed in said structure and adapted for coupling to an operator's control wheel and operative responsive to rotation of an associated operator's control wheel for providing a source of fluid pressure to an associated hydraulic steering system; fluid flow control valve means mounted in said housing structure in close and compact physical relationship to said pump; said control valve means including a plurality of shuttle members, poppet valves and unidirectional flow valves disposed and arranged for cooperative interaction and operation responsive to a differential of pressure generated between an inlet and outlet of said pump upon operation of the pump for selectively controlling fluid to opposite ends of an associated fluid power motor while concomitant therewith permitting the release of fluid from an end of the associated fluid power motor opposite the end to which fluid is admitted.

8. The invention according to claim 7 and further characterized in that said fluid flow control valve means includes two pairs of poppet valves and two shuttle members with a shuttle member disposed between a respective pair of said poppet valves and cooperative with each poppet of the pair thereof for controlling the flow of fluid through the said control unit.

9. The invention according to claim 8 and further characterized in that each of said poppet valves includes a movable primary poppet element that presents a relatively large radially extending surface area exposed to a stream of fluid transmittable therethrough so that minimal movement of said element permits the passage of large quantities of fluid through a respective valve.

10. The invention according to claim 9 and further characterized in that each of said poppet valves includes a small pilot poppet element slidably mounted within said primary poppet element, and spring means biasing said pilot and primary poppet elements to a closed position, and having said pilot poppet element operative responsive to engagement with a respective shuttle member for initially permitting a small pilot flow of fluid therethrough that is effective for reducing the fluid pressure normally required for displacing the primary poppet element and permitting the flow of large quantities of fluid through said valve.

11. The invention according to claim 8 and further characterized in that said control means is so constructed and arranged that in a first position thereof all said poppet valves and check valves are closed and the shuttle members are centered between their respective poppet valves and fluid flow through said control valve means is interrupted, and in a second position of the said means a selected three of said poppet valves are open to the flow of fluid therethrough with one of the poppet valves of one pair of poppet valves remaining closed while both shuttle elements are shifted in the same direction and two only of the unidirectional flow valves are opened so as to permit the flow of fluid from an associated source of fluid pressure through said means and through said pump to one end of an associated fluid power motor while concomitant therewith permitting the flow of fluid out of an opposite end of the associated fluid power motor, and in a third position of said means a different three of said poppet valves are open to the flow of fluid therethrough with the other one of the poppet valves of said one pair of poppet valves remaining closed while both shuttle elements are shifted in a direction opposite to that of said second position and the same two unidirectional flow valves are opened so as to permit the flow of fluid from an associated source of fluid pressure through said means and through said pump to an end of an associated fluid power motor opposite from that of said second position while concomitant therewith permitting the flow of fluid out of an opposite end of the associated fluid power motor.

References Cited

UNITED STATES PATENTS

| | | |
|---|---|---|
| 1,993,612 | 3/1935 | Lum. |
| 2,512,979 | 6/1950 | Strother. |
| 2,984,215 | 5/1961 | Charlson. |
| 2,995,012 | 8/1961 | Cassaday et al. |

EDGAR W. GEOGHEGAN, *Primary Examiner.*

U.S. Cl. X.R.

103—130; 180—79.2